US011909123B2

(12) United States Patent
Kong et al.

(10) Patent No.: US 11,909,123 B2
(45) Date of Patent: Feb. 20, 2024

(54) MULTIBEAM ANTENNA

(71) Applicant: Huawei Technologies Co., Ltd., Shenzhen (CN)

(72) Inventors: Long Kong, Shenzhen (CN); Min Yu, Chengdu (CN); Yi Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/879,090

(22) Filed: Aug. 2, 2022

(65) Prior Publication Data

US 2022/0368037 A1 Nov. 17, 2022

Related U.S. Application Data

(63) Continuation of application No. PCT/CN2020/130046, filed on Nov. 19, 2020.

(30) Foreign Application Priority Data

Feb. 4, 2020 (CN) ......................... 202010079798.9

(51) Int. Cl.
*H01Q 25/00* (2006.01)
*H01Q 15/18* (2006.01)

(52) U.S. Cl.
CPC ............. *H01Q 25/00* (2013.01); *H01Q 15/18* (2013.01)

(58) Field of Classification Search
CPC .......... H01Q 25/00; H01Q 15/18; H01Q 9/28; H01Q 19/18; H01Q 19/30; H01Q 1/36; H01Q 1/50
See application file for complete search history.

(56) References Cited

U.S. PATENT DOCUMENTS 6,150,990 A 11/2000 Ramanujam et al.
2003/0160730 A1* 8/2003 Alsliety ................. H01Q 19/30 343/795

(Continued)

FOREIGN PATENT DOCUMENTS

CN 101542840 A 9/2009
CN 102013559 A 4/2011

(Continued)

OTHER PUBLICATIONS

Shaoquan, X., “Principle and Application of GPS Measurement,” Wuhan University Press, Jan. 2017, 6 pages (with English Abstract).

(Continued)

*Primary Examiner* — Hoang V Nguyen
(74) *Attorney, Agent, or Firm* — Slater Matsil, LLP

(57) ABSTRACT

A multibeam antenna including a substrate, and further includes an antenna element, a first guiding apparatus, and a second guiding apparatus disposed on the substrate. The antenna element includes a first pole configured to receive a feeding signal and a second pole that is grounded. The first guiding apparatus enables a first beam generated by the antenna element to radiate in a first direction, and the second guiding apparatus enables a second beam generated by the antenna element to radiate in a second direction. A phase center of the antenna element is at an intersecting point of a first axis and a second axis, the first axis passing through a phase center of the first guiding apparatus and parallel to the first direction, and the second axis passing through a phase center of the second guiding apparatus and parallel to the second direction.

20 Claims, 12 Drawing Sheets

(56) References Cited

U.S. PATENT DOCUMENTS

| | | | |
|---|---|---|---|
| 2005/0179605 A1 | 8/2005 | Iigusa et al. |
| 2010/0007573 A1 | 1/2010 | Kuramoto et al. |
| 2013/0099974 A1 | 4/2013 | Wang et al. |
| 2016/0365632 A1 | 12/2016 | Lee |
| 2017/0062924 A1 | 3/2017 | Lee et al. |

FOREIGN PATENT DOCUMENTS

| | | |
|---|---|---|
| CN | 102110914 A | 6/2011 |
| CN | 103682645 A | 3/2014 |
| CN | 104051850 A | 9/2014 |
| CN | 105576356 A | 5/2016 |
| CN | 106602245 A | 4/2017 |
| CN | 107516769 A | 12/2017 |
| CN | 208028218 U | 10/2018 |
| CN | 108987949 A | 12/2018 |
| CN | 110444902 A | 11/2019 |
| JP | 2005229487 A | 8/2005 |
| JP | 2006066993 A | 3/2006 |
| JP | 2006129092 A | 5/2006 |

OTHER PUBLICATIONS

Xinde, K. et al., "Practical Antenna Engineering Technology," Published by Xidian University Press, 2015, 10 pages (Abstract Only).

Zhong-Liang, L. et al., "A Planar Electronically Controlled Antenna Array with Beam Steering," Journal of Electronics & Information Technology, vol. 36, No. 6, Jun. 2014, 13 pages (with English Translation).

Qin, Pei-Yuan et al., "A Beam Switching Quasi-Yagi Dipole Antenna", IEEE Transactions on Antennas and Propagation, vol. 61, No. 10, Oct. 2013, pp. 4891-4899.

Wu, Yongle et al., "Graphene-based Yagi-Uda antenna with reconfigurable radiation patterns", AIP Advances 6, Jun. 9, 2016, 11 pages.

Huang, Huan-Chu, et al., "A Simple Planar High-Directivity Yagi-Uda Antenna with a Concave Parabolic Reflector", 2010 International Workshop on Antenna Technology (iWAT), Mar. 1-3, 2010, 4 pages.

Zhongliang Lu, et al. "A Novel Planar Beam Steering Antenna", 2013 IEEE International Wireless Symposium (IWS), published Oct. 3, 2013, DOI: 10.1109/IEEE-IWS.2013.6616838, 4 pages.

* cited by examiner

MULTIBEAM ANTENNA

CROSS-REFERENCE TO RELATED APPLICATIONS

This application is a continuation of International Application No. PCT/CN2020/130046, filed on Nov. 19, 2020, which claims priority to Chinese Patent Application No. 202010079798.9, filed on Feb. 4, 2020. The disclosures of the aforementioned applications are hereby incorporated by reference in their entireties.

TECHNICAL FIELD

This application relates to the antenna field, and in particular, to a multibeam antenna.

BACKGROUND

With rapid development of a modern communications system, people raise increasingly high requirements on a communications rate, a channel capacity, a data throughput, user coverage, and other aspects of the communications system. As a most front-end component of the communications system, an antenna also faces more requirements. A conventional single-beam antenna usually has only one main radiation direction. When a location for placing the antenna is determined, the main radiation direction is also determined. Therefore, it is difficult to consider radiation in a plurality of directions at the same time.

Compared with the single-beam antenna, a multibeam antenna has a plurality of main radiation directions. This can increase a coverage area of the antenna, and meet a requirement of an existing communications system for wide coverage. Combining a plurality of antennas, for example, designing an antenna in a form of an array antenna, to produce radiation in different directions is a method for implementing a plurality of beams. However, a complex feeding network needs to be disposed for the array antenna, resulting in a relatively large overall size of the antenna.

SUMMARY

Embodiments of this application provide a multibeam antenna. The multibeam antenna can implement beam coverage in at least two directions by feeding through at only one end. There is no need to dispose a complex feeding network, thereby facilitating miniaturization of the multibeam antenna.

According to a first aspect, a multibeam antenna provided in the embodiments of this application includes a substrate, an antenna element, a first guiding apparatus, and a second guiding apparatus. The antenna element, the first guiding apparatus, and the second guiding apparatus are disposed on the substrate. The antenna element includes a first pole and a second pole. The first pole is configured to receive a feeding signal. The second pole is grounded. The first guiding apparatus is configured to enable a first beam generated by the antenna element to radiate in a first direction. The second guiding apparatus is configured to enable a second beam generated by the antenna element to radiate in a second direction. A phase center of the antenna element is located at an intersecting point of a first axis and a second axis. The first axis passes through a phase center of the first guiding apparatus and is parallel to the first direction. The second axis passes through a phase center of the second guiding apparatus and is parallel to the second direction.

In this implementation, the first guiding apparatus is configured to enable the first beam generated by the antenna element to radiate in the first direction, and the second guiding apparatus is configured to enable the second beam generated by the antenna element to radiate in the second direction. The multibeam antenna can implement beam coverage in at least two directions by feeding through at only one end. There is no need to dispose a complex feeding network, thereby facilitating miniaturization of the multibeam antenna.

Optionally, in some possible implementations, the first guiding apparatus and the second guiding apparatus each are configured to enhance radiation of the antenna in a specific direction. Specifically, a type of the first guiding apparatus and a type of the second guiding apparatus each include a director and a reflector. A beam radiation direction under an effect of a reflector is a direction from the reflector to the antenna element. A beam radiation direction under an effect of a director is a direction from the antenna element to the director. For example, the first guiding apparatus and the second guiding apparatus may both be reflectors or directors, or one may be a reflector and the other may be a director. In this implementation, a plurality of specific types of the first guiding apparatus and the second guiding apparatus are provided, thereby improving extensibility of this solution.

Optionally, in some possible implementations, the multibeam antenna further includes a feeder. The first pole is disposed on a first surface of the substrate, and the second pole is disposed on a second surface of the substrate. Specifically, the feeder may be a coaxial cable. An inner conductor of the feeder is connected to the first pole, and an outer conductor of the feeder is connected to the second pole, so that the first pole receives the feeding signal, and the second pole is grounded. In this implementation, a specific implementation for connecting the antenna element to the feeder is provided, thereby improving implementability of this solution.

Optionally, in some possible implementations, the multibeam antenna further includes a feeder, and the first pole, the second pole, and the feeder are disposed on a first surface of the substrate or a second surface of the substrate. In this implementation, another specific implementation for connecting the antenna element to the feeder is provided, thereby improving flexibility of this solution.

Optionally, in some possible implementations, the first guiding apparatus is disposed on the first surface of the substrate or the second surface of the substrate, and the second guiding apparatus is disposed on the first surface of the substrate or the second surface of the substrate. In this implementation, the first guiding apparatus and the second guiding apparatus may be disposed on a same surface of the substrate, or may be disposed on different surfaces of the substrate, thereby enriching implementations of this application.

Optionally, in some possible implementations, the antenna element is disposed along an angle bisector of an included angle between the first axis and the second axis. In this case, gain values of the two beams are approximate. For example, the antenna element overlaps the angle bisector, or the antenna element is symmetrical about the angle bisector. In addition, alternatively, the antenna element may not be disposed along the angle bisector. For example, if the antenna element rotates around its own phase center, correspondingly, gain values of the two beams may differ greatly. In this implementation, the antenna element may be rotated based on an actual need to meet different gain requirements.

Optionally, in some possible implementations, the first axis is perpendicular to the second axis. In this case, induced current components on the first guiding apparatus and the second guiding apparatus are orthogonal to each other, the two beams are incoherently superposed, and the two beams have highest independence. Certainly, the included angle between the first axis and the second axis may not be 90 degrees, thereby improving extensibility of this solution.

Optionally, in some possible implementations, a resonance length of the antenna element is different from a length of the first guiding apparatus and a length of the second guiding apparatus. A length of a reflector is greater than the resonance length of the antenna element. A length of a director is less than the resonance length of the antenna element.

Optionally, in some possible implementations, the multibeam antenna further includes a third guiding apparatus and a fourth guiding apparatus. A type of the third guiding apparatus and a type of the fourth guiding apparatus each include a director and a reflector. The third guiding apparatus is configured to enable the first beam to radiate in the first direction. The fourth guiding apparatus is configured to enable the second beam to radiate in the second direction. The antenna element is located between the first guiding apparatus and the third guiding apparatus. The antenna element is located between the second guiding apparatus and the fourth guiding apparatus. In this implementation, disposing the third guiding apparatus and the fourth guiding apparatus can enhance a gain effect of the first beam in the first direction and a gain effect of the second beam in the second direction.

Optionally, in some possible implementations, if the first guiding apparatus is a director, at least one additional director may be further placed side by side with the first guiding apparatus along the first direction, so as to increase the gain of the first beam. Similarly, if the second guiding apparatus is a director, at least one additional director may be further placed side by side with the second guiding apparatus along the second direction, so as to increase the gain of the second beam.

It can be learned from the foregoing technical solutions that the embodiments of this application have the following advantages.

In the embodiments of this application, the first guiding apparatus is configured to enable the first beam generated by the antenna element to radiate in the first direction, and the second guiding apparatus is configured to enable the second beam generated by the antenna element to radiate in the second direction. The multibeam antenna can implement beam coverage in at least two directions by feeding through at only one end. There is no need to dispose a complex feeding network, thereby facilitating miniaturization of the multibeam antenna.

DETAILED DESCRIPTION OF ILLUSTRATIVE EMBODIMENTS

Embodiments of this application provide a multibeam antenna. The multibeam antenna can implement beam coverage in at least two directions by feeding through at only one end. There is no need to dispose a complex feeding network, thereby facilitating miniaturization of the multibeam antenna. In this specification, the claims, and the accompanying drawings of this application, terms “first”, “second”, “third”, “fourth”, and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, terms “include”, “comprise”, and any other variants thereof mean to cover non-exclusive inclusion. For example, a process, method, system, product, or device that includes a list of steps or units is not necessarily limited to those steps or units, but may include other steps or units not expressly listed or inherent to such a process, method, product, or device.

Figure 1:
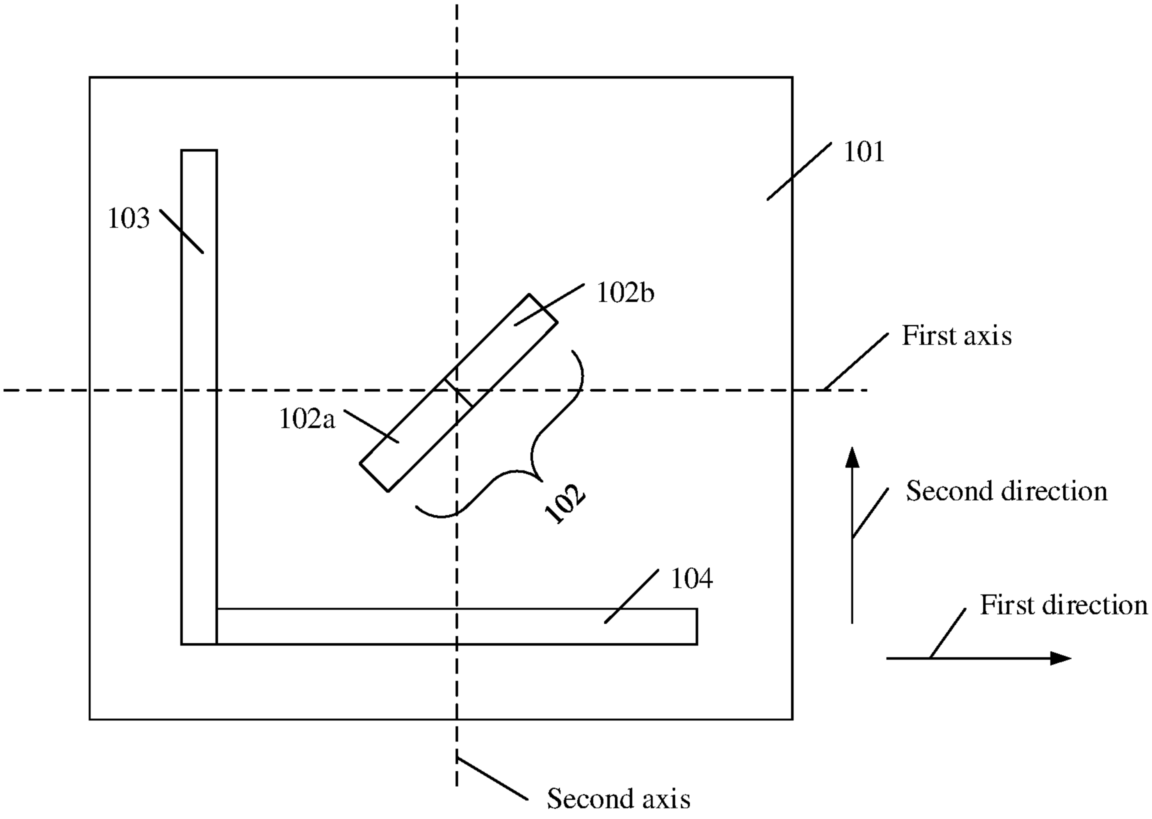
FIG. 1 is a schematic diagram of a first structure of a multibeam antenna according to an embodiment of this application.

FIG. 1 is a schematic diagram of a first structure of a multibeam antenna according to an embodiment of this application. The multibeam antenna includes a substrate 101, an antenna element 102, a first guiding apparatus 103, and a second guiding apparatus 104. The antenna element 102, the first guiding apparatus 103, and the second guiding apparatus 104 are all disposed on the substrate 101. The antenna element 102 includes two poles: a first pole **102*a* and a second pole 102*b*. The first pole 102*a* is configured to receive a feeding signal. The second pole 102*b* is grounded. The first guiding apparatus 103 and the second guiding apparatus 104 are configured to enable beams generated by the antenna element 102 to radiate in different directions. Specifically, the first guiding apparatus 103 enables a first beam to radiate in a first direction, and the second guiding apparatus 104 enables a second beam to radiate in a second direction. A phase center of the antenna element 102 is located at an intersecting point of a first axis and a second axis. The first axis passes through a phase center of the first guiding apparatus 103 and is parallel to the first direction. The second axis passes through a phase center of the second guiding apparatus 104** and is parallel to the second direction.

It should be noted that, after an electromagnetic wave radiated by the antenna element 102 leaves the antenna element 102 for a specific distance, an equiphase surface of the electromagnetic wave may be approximately a spherical surface, and a spherical center of the spherical surface is the phase center of the antenna element 102. The phase center should theoretically be a point. That is, theoretically, it may be considered that a signal radiated by the antenna element 102 is radiated outwards with this point as a circle center. However, in actual application, such perfect practice is usually impossible. Therefore, the phase center of the antenna element may be understood as an area. In addition, phase centers of the first guiding apparatus 103 and the second guiding apparatus 104 are similar, except that the first guiding apparatus 103 and the second guiding apparatus 104 do not receive a feeding signal, because their phase centers are generated by self-resonance. It can be understood that, if the antenna element 102, the first guiding apparatus 103, and the second guiding apparatus 104 all have regular geometric shapes, geometric centers thereof are the phase centers.

Optionally, the first guiding apparatus 103 and the second guiding apparatus 104 each are configured to enhance radiation of the antenna in a specific direction. A type of the first guiding apparatus 103 and a type of the second guiding apparatus 104 each include a director and a reflector. After receiving the feeding signal, the antenna element 102 generates a current component perpendicular to each radiation direction. A current component in a specific direction excites an induced current component on a reflector or a director along the same direction. A reflector enables a phase lead of an induced current component on the reflector to excite the antenna element 102. A director enables a phase lag of an induced current component on the director to excite the antenna element 102. A length of a reflector is greater than a resonance length of the antenna element 102. A length of a director is less than the resonance length of the antenna element 102. A beam radiation direction under an effect of a reflector is a direction from the reflector to the antenna element 102. A beam radiation direction under an effect of a director is a direction from the antenna element 102 to the director. For example, the first guiding apparatus 103 and the second guiding apparatus 104 shown in FIG. 1 each are a reflector.

Figure 2:
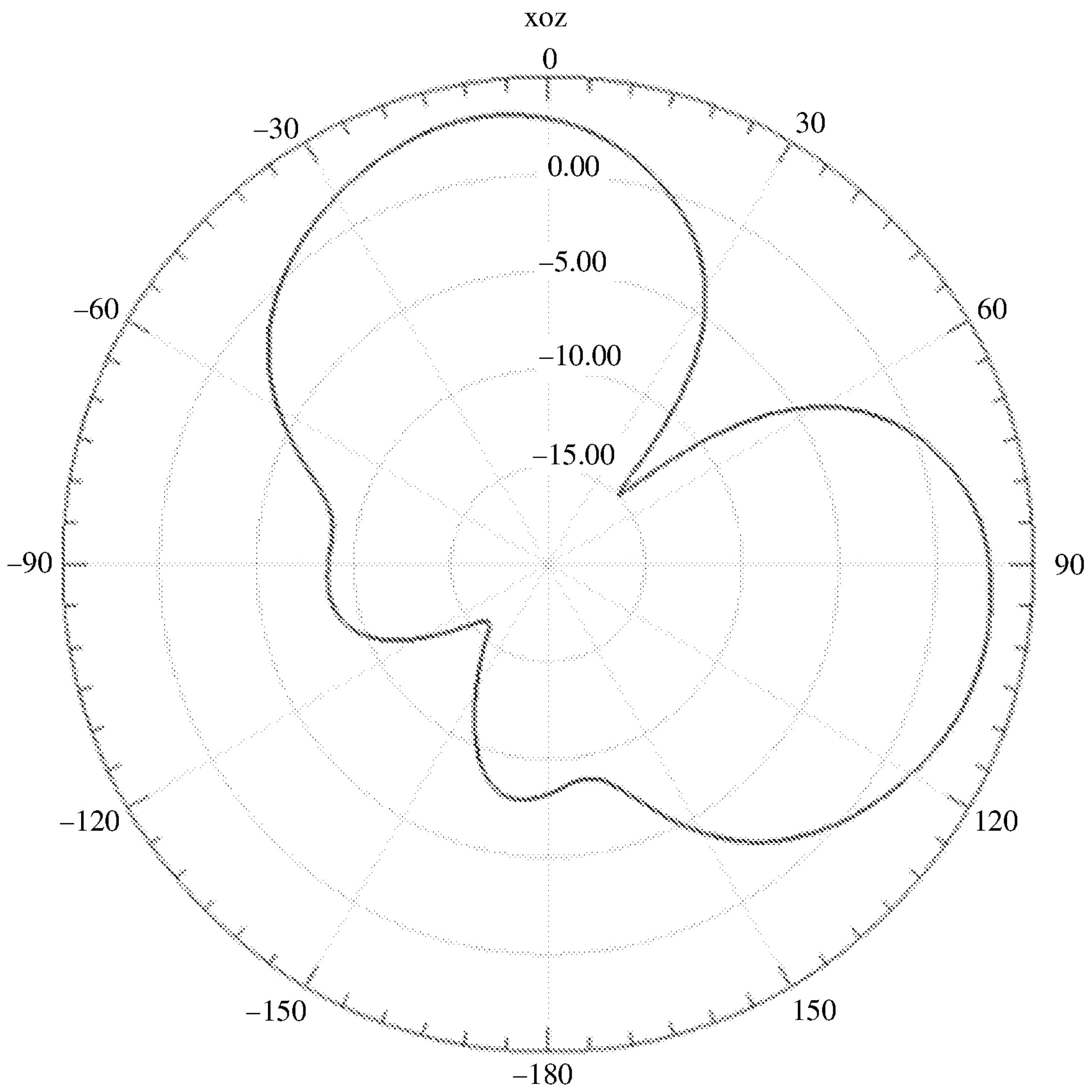
FIG. 2 shows a directivity pattern of a multibeam antenna.

It can be understood that, more guiding apparatuses may be further disposed on the basis of the first guiding apparatus 103 and the second guiding apparatus 104. A plurality of beams have different radiation directions, and are superposed in space to form multibeam radiation. Using the structure of the multibeam antenna shown in FIG. 1 as an example, FIG. 2 shows a directivity pattern of the multibeam antenna. It can be seen that, the multibeam antenna has two main radiation directions.

Figure 3:
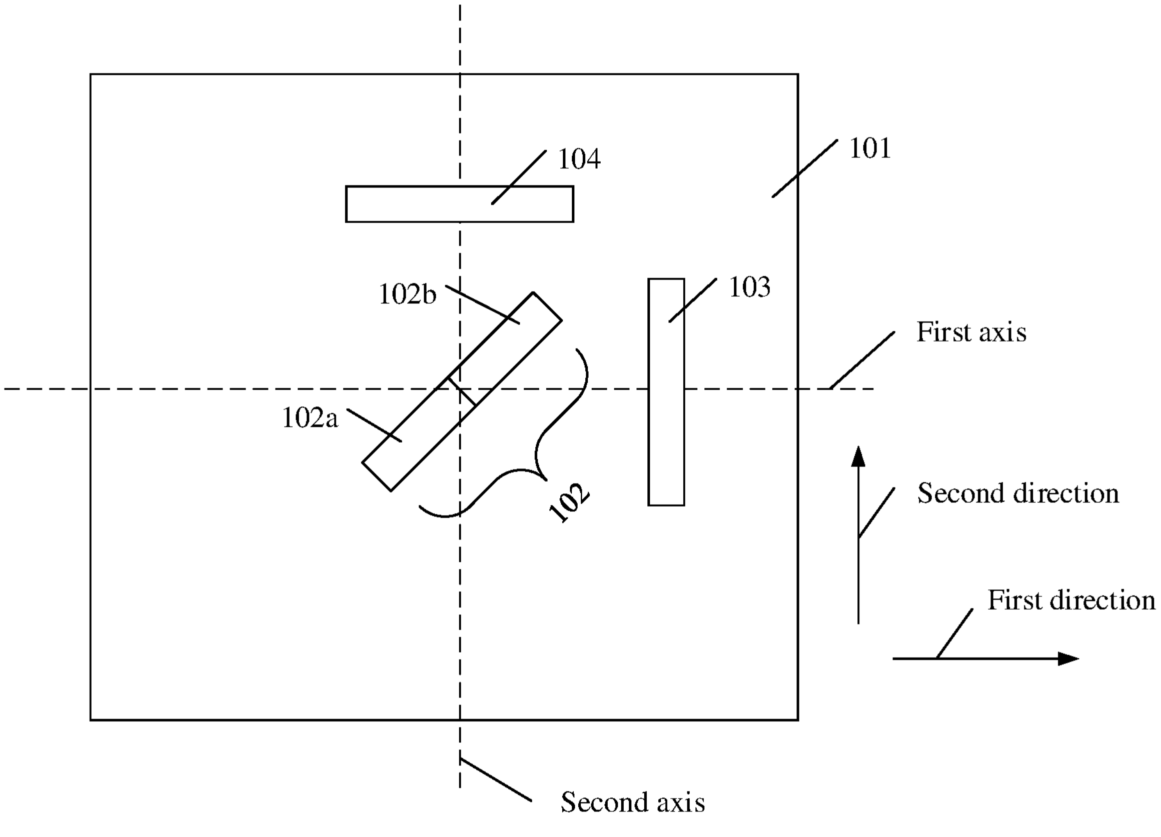
FIG. 3 is a schematic diagram of a second structure of a multibeam antenna according to an embodiment of this application.

FIG. 3 is a schematic diagram of a second structure of a multibeam antenna according to an embodiment of this application. The first guiding apparatus 103 and the second guiding apparatus 104 each are a director.

Figure 4:
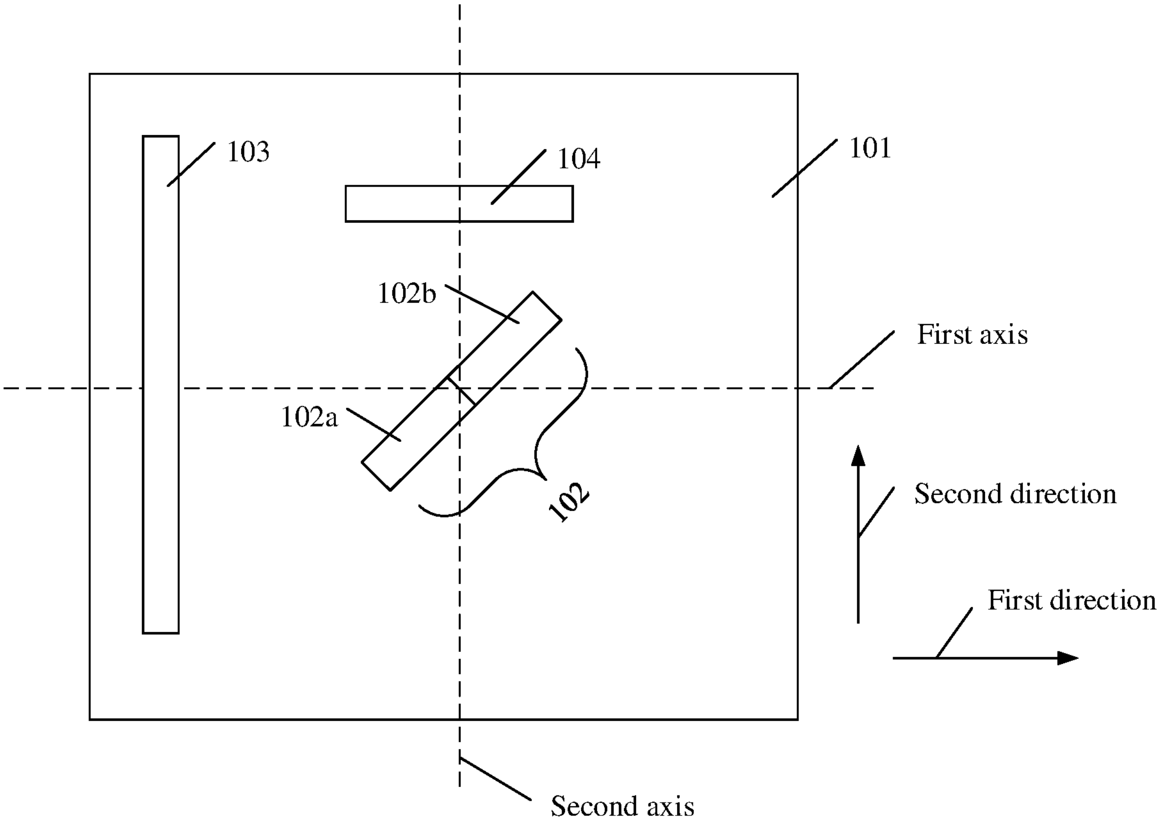
FIG. 4 is a schematic diagram of a third structure of a multibeam antenna according to an embodiment of this application.

FIG. 4 is a schematic diagram of a third structure of a multibeam antenna according to an embodiment of this application. The first guiding apparatus 103 is a reflector, and the second guiding apparatus 104 is a director.

Figure 5:
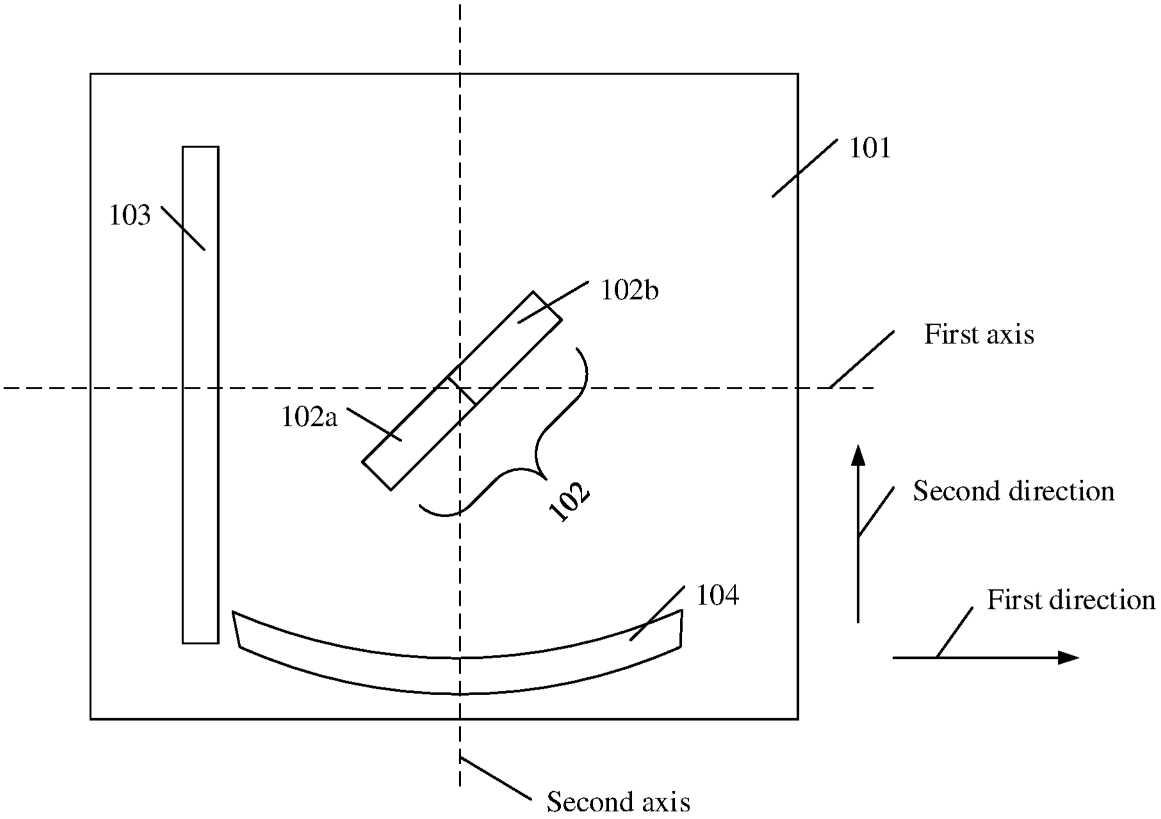
FIG. 5 is a schematic diagram of a fourth structure of a multibeam antenna according to an embodiment of this application.

Optionally, the first guiding apparatus 103 and the second guiding apparatus 104 both may have regular geometric shapes, for example, may be strip reflectors shown in FIG. 1, or may have other shapes. This is not specifically limited herein. For example, FIG. 5 is a schematic diagram of a fourth structure of a multibeam antenna according to an embodiment of this application. The second guiding apparatus may be an arc reflector.

Figure 6:
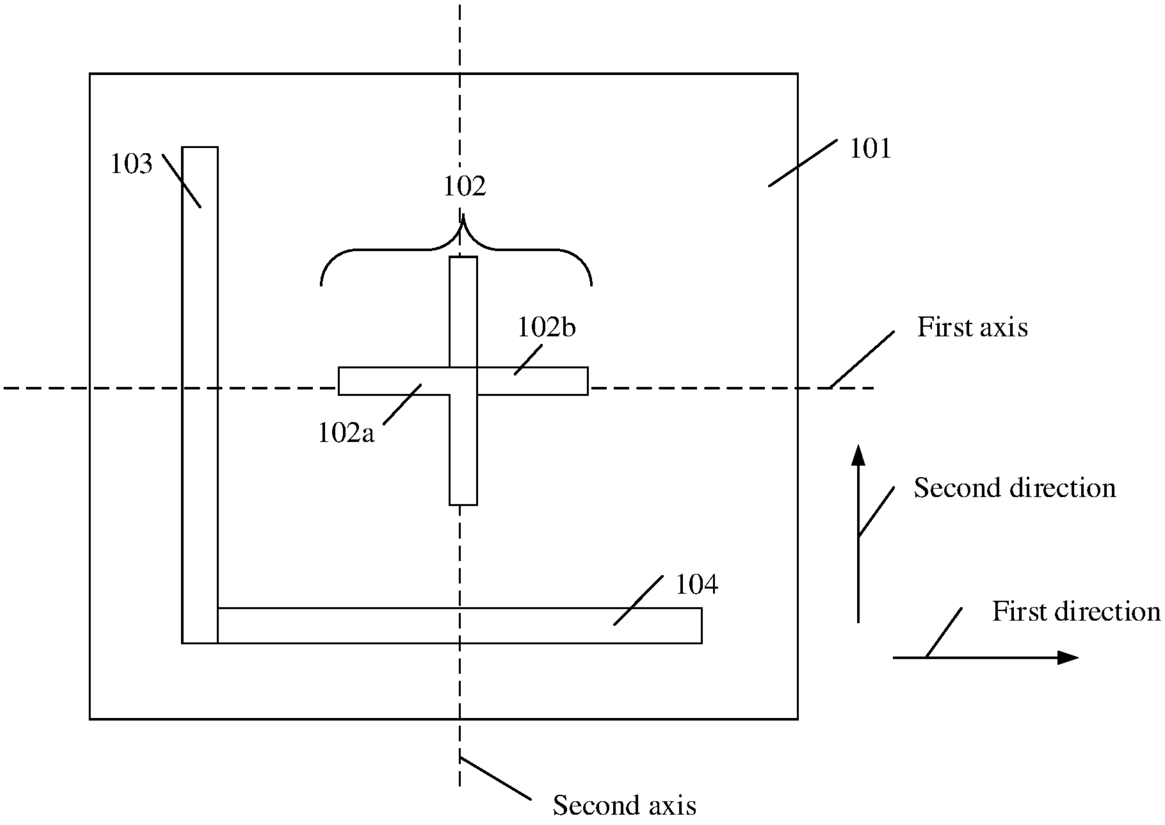
FIG. 6 is a schematic diagram of a fifth structure of a multibeam antenna according to an embodiment of this application.

Optionally, a shape of the antenna element 102 is not limited in this application. The antenna element 102 may be hyphen-shaped, as shown in FIG. 1. The first pole 102*a* and the second pole 102*b* are two branches. In addition, FIG. 6 is a schematic diagram of a fifth structure of a multibeam antenna according to an embodiment of this application. The antenna element 102 is cross-shaped. Similarly, the first pole 102*a* and the second pole 102*b* are two branches.

Figure 7:
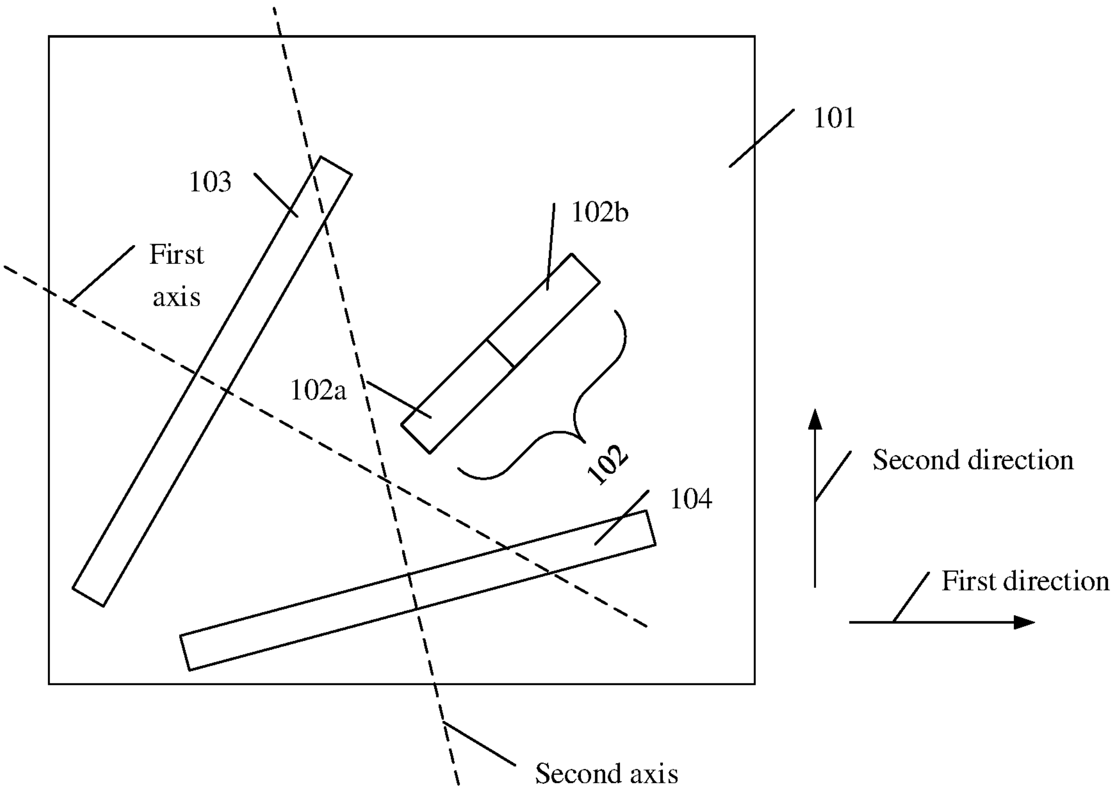
FIG. 7 is a schematic diagram of a sixth structure of a multibeam antenna according to an embodiment of this application.

Optionally, FIG. 7 is a schematic diagram of a sixth structure of a multibeam antenna according to an embodiment of this application. This application does not limit an included angle between the first axis and the second axis. In other words, locations for placing the first guiding apparatus 103 and the second guiding apparatus 104 may be variable. For example, the included angle between the first axis and the second axis may be an acute angle shown in FIG. 7, or may be a right angle shown in FIG. 1. It should be noted that, if the included angle between the first axis and the second axis is a right angle, induced current components on the first guiding apparatus 103 and the second guiding apparatus 104 are orthogonal to each other. In this case, the two beams are incoherently superposed, and the two beams have highest independence.

Figure 8:
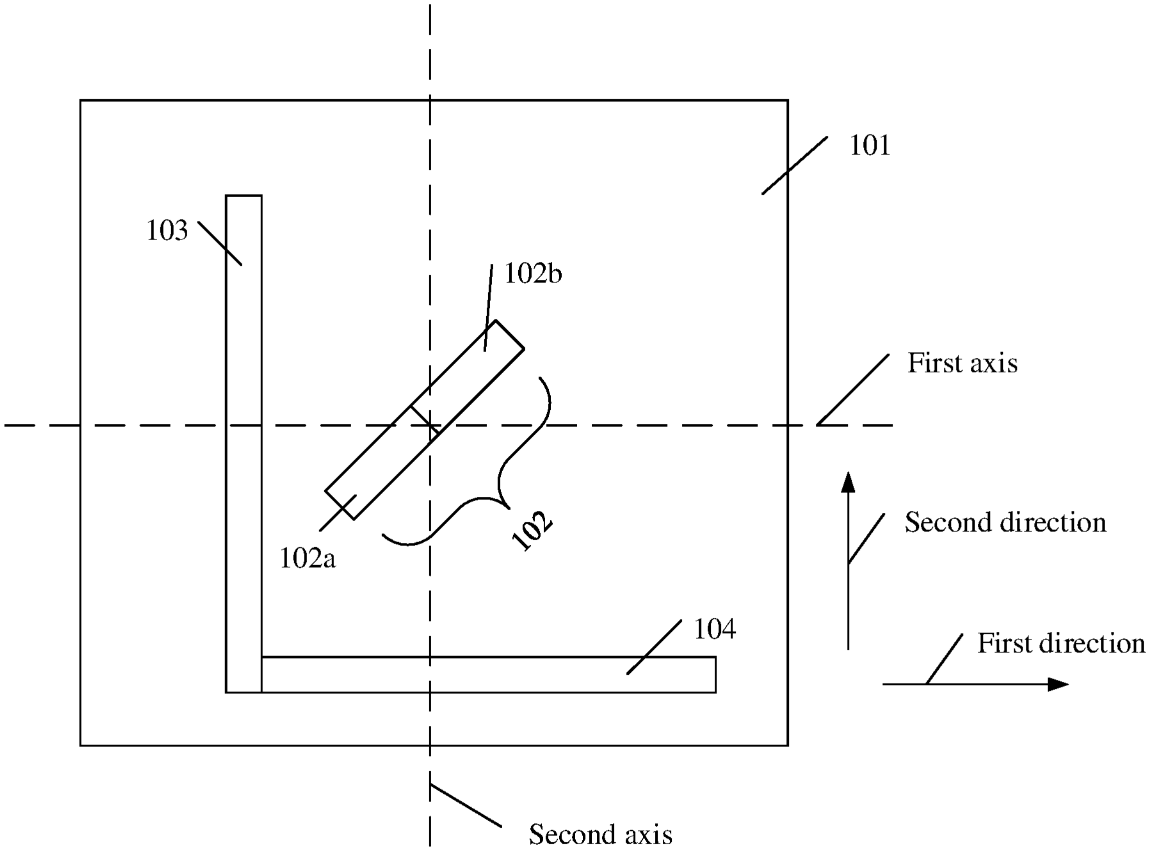
FIG. 8 is a schematic diagram of a seventh structure of a multibeam antenna according to an embodiment of this application.
Figure 9:
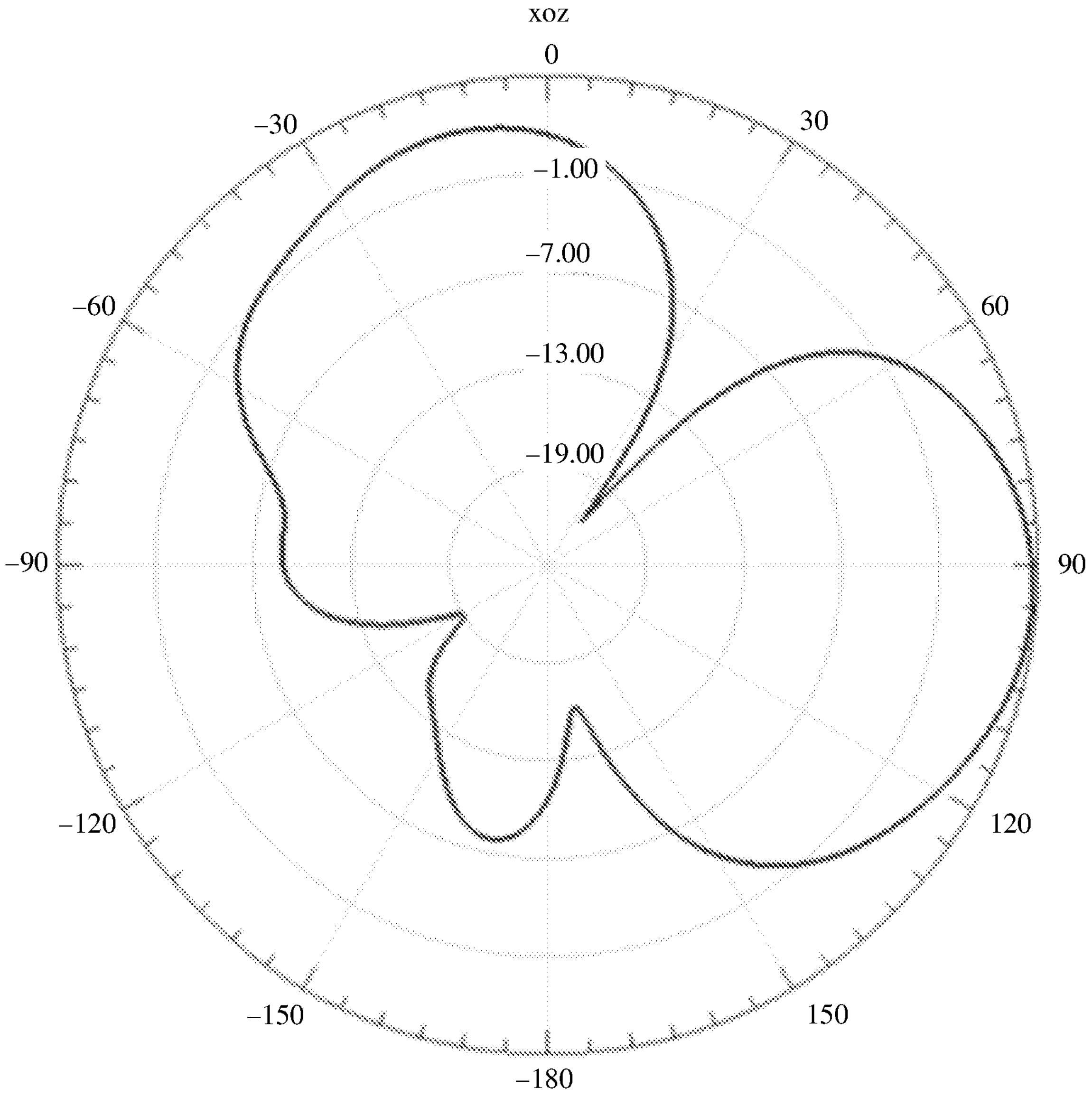
FIG. 9 shows another directivity pattern of a multibeam antenna.

Optionally, the antenna element 102 may be disposed along an angle bisector of the included angle between first axis and the second axis. In this case, gain values of the two beams are approximate. For example, the antenna element 102 in FIG. 1 overlaps the angle bisector. In FIG. 6, the antenna element 102 is symmetrical about the angle bisector. Besides, alternatively, the antenna element 102 may not be disposed along the angle bisector. For details, refer to FIG. 8. FIG. 8 is a schematic diagram of a seventh structure of a multibeam antenna according to an embodiment of this application. Compared with the antenna element 102 shown in FIG. 1, the antenna element 102 in FIG. 8 rotates around its own phase center. Correspondingly, gain values of the two beams may differ greatly. The structure of the multibeam antenna shown in FIG. 8 is used as an example. FIG. 9 shows another directivity pattern of the multibeam antenna. Compared with the roughly same gain values of the two beams in the directivity pattern shown in FIG. 2, gain values of the two beams in the directivity pattern shown in FIG. 9 differ greatly as the antenna element 102 rotates. Therefore, in actual application, the antenna element 102 may be properly rotated as required.

Figure 10:
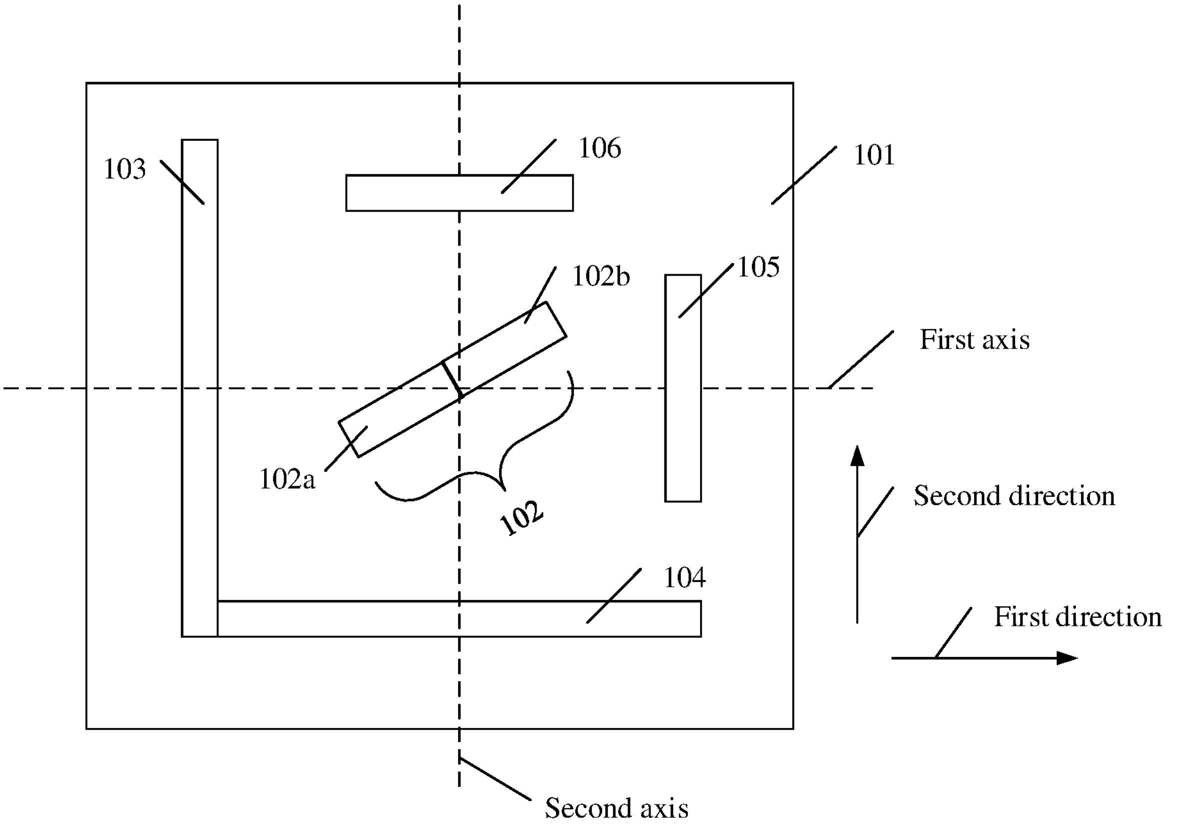
FIG. 10 is a schematic diagram of an eighth structure of a multibeam antenna according to an embodiment of this application.

Optionally, FIG. 10 is a schematic diagram of an eighth structure of a multibeam antenna according to an embodiment of this application. The multibeam antenna may further include a third guiding apparatus 105 corresponding to the first guiding apparatus 103 and a fourth guiding apparatus 106 corresponding to the second guiding apparatus 104. A function of the third guiding apparatus 105 is similar to a function of the first guiding apparatus 103, and can enable the first beam to radiate in the first direction. A function of the fourth guiding apparatus 106 is similar to a function of the second guiding apparatus 104, and can enable the second beam to radiate in the second direction. Disposing the third guiding apparatus 105 and the fourth guiding apparatus 106 can enhance a gain effect of the first beam in the first direction and a gain effect of the second beam in the second direction. For example, in FIG. 10, if the first guiding apparatus 103 and the second guiding apparatus 104 each are a reflector, the third guiding apparatus 105 and the fourth guiding apparatus 106 each are a director. For another example, if the first guiding apparatus 103 and the second guiding apparatus 104 each are a director, the third guiding apparatus 105 and the fourth guiding apparatus 106 each are a reflector. For another example, if the first guiding apparatus 103 is a reflector and the second guiding apparatus 104 is a director, the third guiding apparatus 105 is a director and the fourth guiding apparatus 106 is a reflector.

Figure 11:
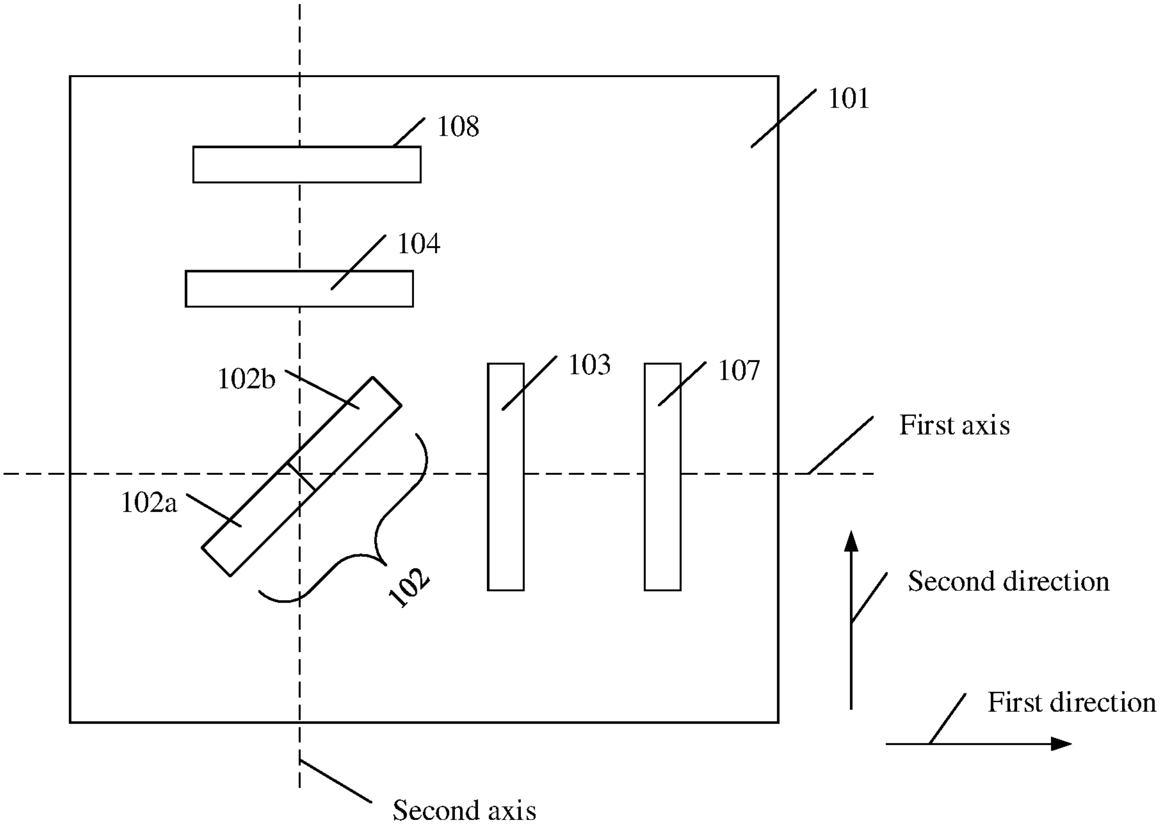
FIG. 11 is a schematic diagram of a ninth structure of a multibeam antenna according to an embodiment of this application.

Optionally, FIG. 11 is a schematic diagram of a ninth structure of a multibeam antenna according to an embodiment of this application. If the first guiding apparatus 103 is a director, at least one additional director may be further placed side by side with the first guiding apparatus 103 along the first direction, so as to increase the gain of the first beam. Similarly, if the second guiding apparatus 104 is a director, at least one additional director may be further placed side by side with the second guiding apparatus 104 along the second direction, so as to increase the gain of the second beam. For example, in FIG. 11, a director 107 is placed side by side with the first guiding apparatus 103 along the first direction, and a director 108 is placed side by side with the second guiding apparatus 104 along the second direction.

Figure 12:
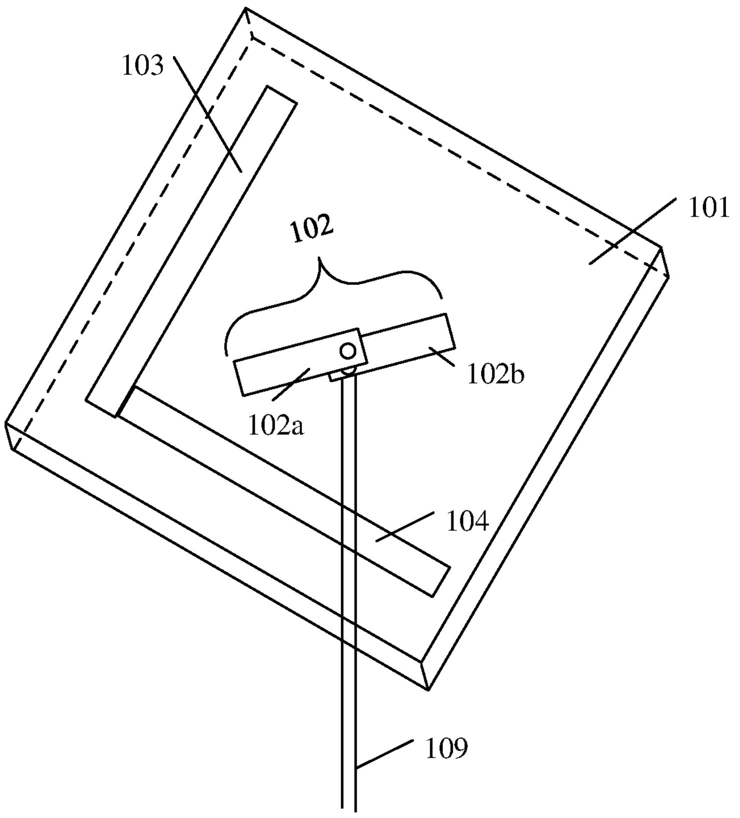
FIG. 12 is a schematic diagram of a tenth structure of a multibeam antenna according to an embodiment of this application.

Optionally, FIG. 12 is a schematic diagram of a tenth structure of a multibeam antenna according to an embodiment of this application. The multibeam antenna may further include a feeder 109. The first pole 102*a* of the antenna element 102 is disposed on an upper surface of the substrate 101. The second pole 102*b* of the antenna element 102 is disposed on a lower surface of the substrate 101. Specifically, the feeder 109 may be a coaxial cable. An inner conductor of the feeder 109 is connected to the first pole 102*a*, and an outer conductor of the feeder 109 is connected to the second pole 102*b*, so that the first pole 102*a* receives the feeding signal, and the second pole 102*b* is grounded. It can be understood that, in addition to the structure shown in FIG. 12, the feeder 109 may alternatively be disposed on a same surface of the substrate 101 together with the first pole 102*a* and the second pole 102*b* of the antenna element 102. This is not specifically limited herein.

Optionally, the first guiding apparatus 103 and the second guiding apparatus 104 may be disposed on the upper surface of the substrate 101, may be disposed on the lower surface of the substrate 101, or may be fixed on four edges of the substrate 101. This is not specifically limited herein.

In the embodiments of this application, the first guiding apparatus is configured to enable the first beam generated by the antenna element to radiate in the first direction, and the second guiding apparatus is configured to enable the second beam generated by the antenna element to radiate in the second direction. The multibeam antenna can implement beam coverage in at least two directions by feeding through at only one end. There is no need to dispose a complex feeding network, thereby facilitating miniaturization of the multibeam antenna.

It should be noted that the foregoing embodiments are merely intended to describe the technical solutions of this application other than to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A multibeam antenna, comprising:

a substrate;

an antenna element;

a first guiding apparatus; and a second guiding apparatus;

wherein the antenna element, the first guiding apparatus, and the second guiding apparatus are disposed on the substrate;

wherein the antenna element comprises a first pole and a second pole, the first pole is configured to receive a feeding signal, and the second pole is grounded, the first pole defines a first end of the antenna element, the second pole defines a second end of the antenna element, a major axis of the first pole is aligned with a major axis of the second pole in a plan view, a first virtual line is aligned with a major axis of the first guiding apparatus, a second virtual line is aligned with a major axis of the second guiding apparatus, the second end of the antenna element is farther than the first end of the antenna element from an intersecting point of the first virtual line and the second virtual line, the intersecting point of the first virtual line and the second virtual line is an intersecting point in a plan view of the multibeam antenna, and a length of the antenna element is less than a length of the first guiding apparatus and a length of the second guiding apparatus;

wherein the first guiding apparatus is configured to enable a first beam generated by the antenna element to radiate in a first direction, wherein the second guiding apparatus is configured to enable a second beam generated by the antenna element to radiate in a second direction; and wherein a phase center of the antenna element is located at an intersecting point of a first axis and a second axis, wherein the first axis passes through a phase center of the first guiding apparatus and is parallel to the first direction, and wherein the second axis passes through a phase center of the second guiding apparatus and is parallel to the second direction.

2. The multibeam antenna according to claim 1, wherein the first guiding apparatus is one of a director or a reflector and wherein the second guiding apparatus is one of a director or a reflector.

3. The multibeam antenna according to claim 1, wherein the multibeam antenna further comprises a feeder, wherein the first pole is disposed on a first surface of the substrate, wherein the second pole is disposed on a second surface of the substrate, wherein an inner conductor of the feeder is connected to the first pole, and wherein an outer conductor of the feeder is connected to the second pole.

4. The multibeam antenna according to claim 1, wherein the multibeam antenna further comprises a feeder, and wherein the first pole, the second pole, and the feeder are disposed on a first surface of the substrate or a second surface of the substrate.

5. The multibeam antenna according to claim 1, wherein the first guiding apparatus is disposed on a first surface of the substrate or a second surface of the substrate, and wherein the second guiding apparatus is disposed on the first surface of the substrate or the second surface of the substrate.

6. The multibeam antenna according to claim 1, wherein the antenna element is disposed along an angle bisector of an angle between the first axis and the second axis.

7. The multibeam antenna according to claim 1, wherein the first axis is perpendicular to the second axis.

8. The multibeam antenna according to claim 1, wherein a resonance length of the antenna element is different from the length of the first guiding apparatus and is different from the length of the second guiding apparatus.

9. The multibeam antenna according to claim 1, wherein the multibeam antenna further comprises a third guiding apparatus and a fourth guiding apparatus, wherein the third guiding apparatus is one of a director or a reflector and wherein the fourth guiding apparatus is one of a director or a reflector, wherein the third guiding apparatus is configured to enable the first beam to radiate in the first direction, wherein the fourth guiding apparatus is configured to enable the second beam to radiate in the second direction, wherein the antenna element is located between the first guiding apparatus and the third guiding apparatus, and wherein the antenna element is located between the second guiding apparatus and the fourth guiding apparatus.

10. The multibeam antenna according to claim 1, wherein the first guiding apparatus is a director, wherein the multibeam antenna further comprises at least one first director, and wherein the first guiding apparatus and the at least one first director are successively disposed along the first direction.

11. The multibeam antenna according to claim 1, wherein the type of the second guiding apparatus is a director, wherein the multibeam antenna further comprises at least one second director, and wherein the second guiding apparatus and the at least one second director are successively disposed along the second direction.

12. An antenna system, comprising:

an antenna element, comprising a first pole and a second pole;

a first guiding apparatus, configured to act as a reflector; and a second guiding apparatus, configured to act as a director, wherein a length of the first guiding apparatus is longer than a length of the second guiding apparatus and a length of the antenna element;

wherein one of the first pole or the second pole is configured to receive a feeding signal, and wherein an other one of the first pole of the second pole is grounded;

wherein the first guiding apparatus is configured to enable a first beam generated by the antenna element to radiate in a first direction, wherein the second guiding apparatus is configured to enable a second beam generated by the antenna element to radiate in a second direction; and wherein a phase center of the antenna element is located at an intersecting point of a first axis and a second axis, wherein the first axis passes through a phase center of the first guiding apparatus and is parallel to the first direction, and wherein the second axis passes through a phase center of the second guiding apparatus and is parallel to the second direction.

13. The antenna system according to claim 12, further comprising a feeder and a substrate; and wherein the first pole is disposed on a first surface of the substrate, wherein the second pole is disposed on a second surface of the substrate, wherein an inner conductor of the feeder is connected to the first pole, and wherein an outer conductor of the feeder is connected to the second pole.

14. The antenna system according to claim 12, wherein the first guiding apparatus is disposed on a first surface of a substrate or a second surface of the substrate, and wherein the second guiding apparatus is disposed on the first surface of the substrate or the second surface of the substrate.

15. The antenna system according to claim 12, wherein the antenna element is disposed along an angle bisector of an angle between the first axis and the second axis.

16. The antenna system according to claim 12, further comprising a third guiding apparatus and a fourth guiding apparatus, wherein the third guiding apparatus is one of a director or a reflector and wherein the fourth guiding apparatus is one of a director or a reflector, wherein the third guiding apparatus is configured to enable the first beam to radiate in the first direction, wherein the fourth guiding apparatus is configured to enable the second beam to radiate in the second direction, wherein the antenna element is located between the first guiding apparatus and the third guiding apparatus, and wherein the antenna element is located between the second guiding apparatus and the fourth guiding apparatus.

17. The antenna system according to claim 12, further comprising at least one second director, and wherein the second guiding apparatus and the at least one second director are successively disposed along the second direction.

18. The antenna system according to claim 12, wherein the one of the first pole or the second pole that is configured to receive the feeding signal is closer to the second guiding apparatus than to the first guiding apparatus.

19. The antenna system according to claim 12, wherein the first guiding apparatus does not intersect the second guiding apparatus.

20. The antenna system according to claim 12, further comprising a substrate, wherein in a plan view the first guiding apparatus is closer to a first edge of the substrate, a second edge of the substrate, and a third edge of the substrate than the second guiding apparatus and the antenna element.

* * * * *